United States Patent [19]

Zetena, Jr.

[11] Patent Number: 4,886,464
[45] Date of Patent: Dec. 12, 1989

[54] REMOTE INTERCONNECTION BOX UTILIZING SHIELDING INTERCONNECTING BRACKETS

[76] Inventor: Maurice F. Zetena, Jr., P. O. Box 59, Bridgewater, Conn. 06752

[21] Appl. No.: 261,580

[22] Filed: Oct. 24, 1988

[51] Int. Cl.$^4$ ............................................. H01R 9/24
[52] U.S. Cl. ...................................... 439/98; 174/51; 174/59; 439/709
[58] Field of Search ................... 439/497, 578–582, 439/607, 610, 709, 712–719, 723, 724, 95–98; 174/59, 60, 35 R, 35 C, 38, 51, 78, 52.1; 361/358, 356

[56] References Cited

U.S. PATENT DOCUMENTS

| | | | |
|---|---|---|---|
| 1,960,938 | 5/1934 | Forbes | 174/35 C |
| 2,324,791 | 7/1943 | McLoughlin et al. | 174/60 |
| 2,448,711 | 9/1948 | Hallett | 174/35 C |
| 2,490,596 | 12/1949 | Morris | 174/35 C |
| 2,707,203 | 4/1955 | Peters | 174/59 |
| 3,769,443 | 10/1973 | Pierzchala et al. | 174/38 |
| 3,983,457 | 9/1976 | Smith | 439/581 |

Primary Examiner—Neil Abrams
Attorney, Agent, or Firm—Haynes N. Johnson

[57] ABSTRACT

An interconnection box is provided for use with a plurality of pairs of composite cables, the cables including a plurality of twisted pairs and shielding braid. The box includes a plurality of electroconductive support brackets mounted on the base, the brackets being insulated from the base, a pair of clamps mounted upon the bracket to receive the braid and hold it in electrical contact with the bracket, and a terminal block mounted on the bracket to interconnect the twisted pairs. This structure permits composite cables to be interconnected with a common shield for each pair of cables through the support bracket, and avoids ground currents between various of the pairs.

7 Claims, 3 Drawing Sheets

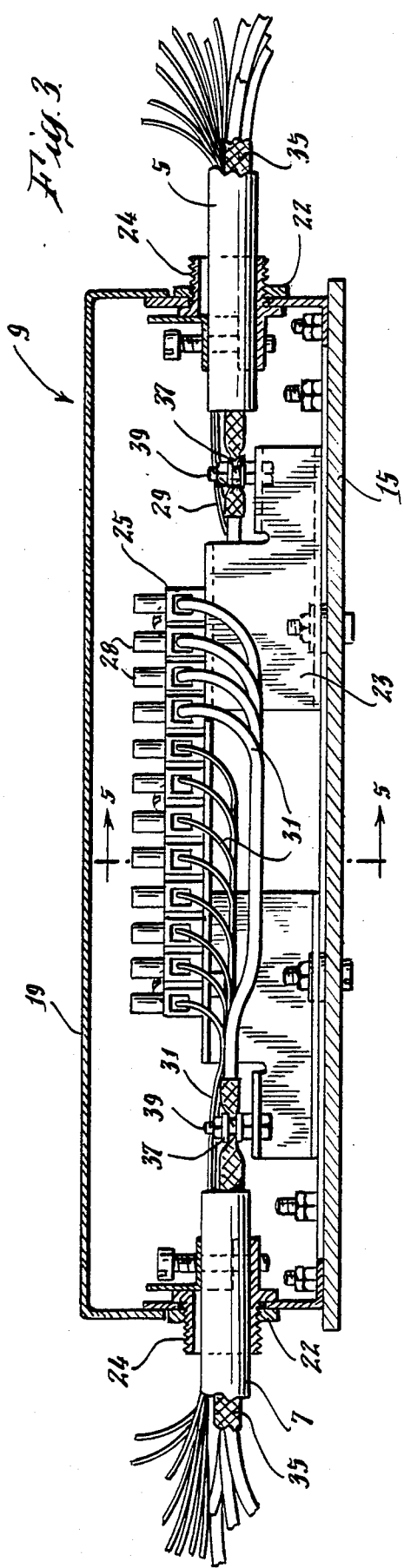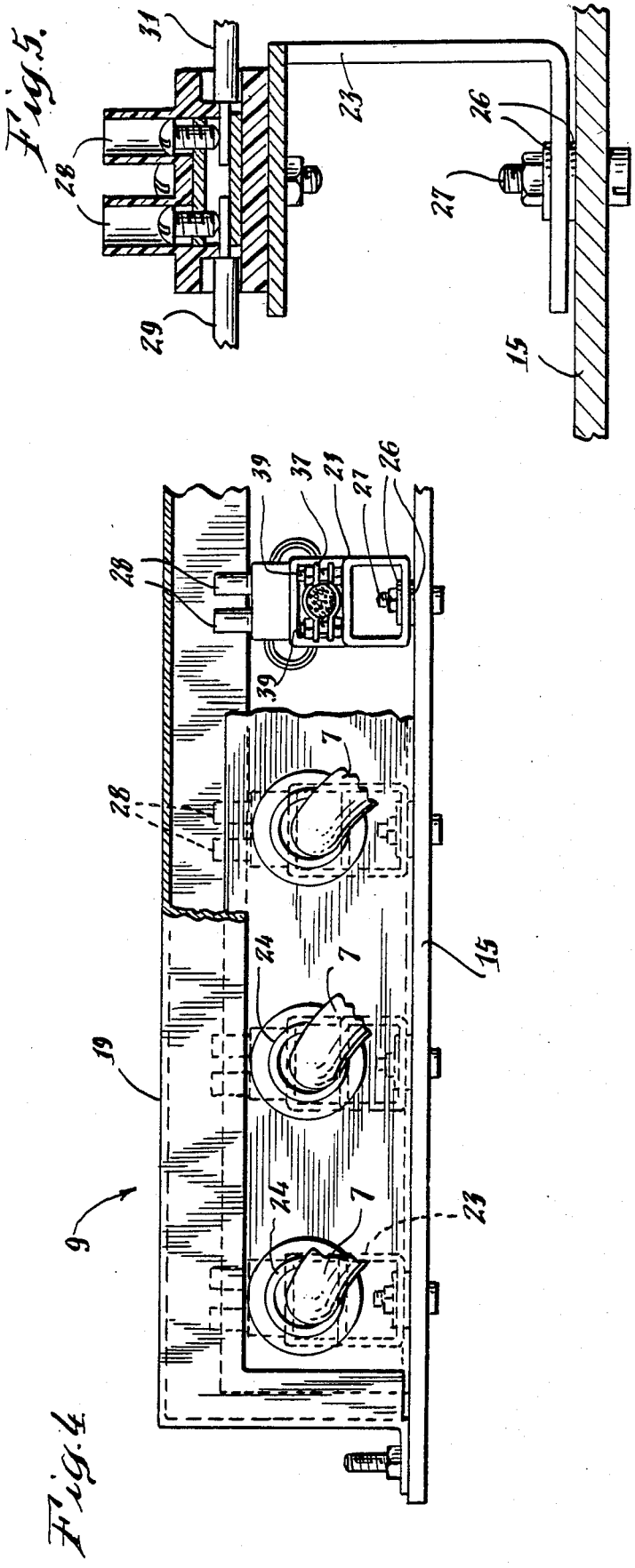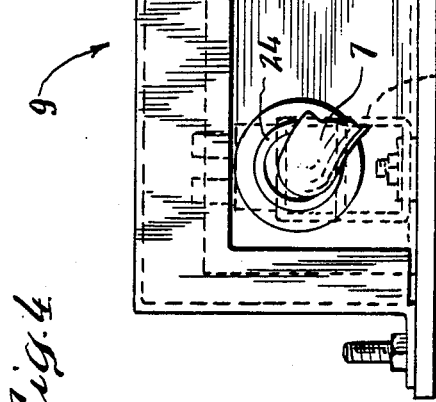

REMOTE INTERCONNECTION BOX UTILIZING SHIELDING INTERCONNECTING BRACKETS

FIELD OF THE INVENTION

This invention relates to transmission systems which interconnect host computers or controllers with a plurality of remote terminals and in which the nature of the interconnections can be changed in a remote interconnection box positioned between the computer and the terminals. The connector box must be capable of interconnecting composite cables carrying both data and voice signals.

Since the data is transmitted at high frequencies, of the order of 13 to 16 megahertz, specially-insulated composite cables must be used.

BACKGROUND OF THE INVENTION

Many offices have a number of computer terminals interconnected to a host computer or controller and to one another through some form of local area netWork. Complementary parallel telephone lines are usually also included with the wiring system. In such networks it is valuable to be able to readily change the interconnections within the system and, of course, important to be able to wire the system initially at minimum cost.

One such system is shown in my U.S. Pat. No. 4,761,811, issued Aug. 2, 1988, for "Data And Voice Transmission Using Composite Cables And Punch-Down Blocks".

My present system provides a different form of remote interconnection box adapted for us with differing types of composite cable. It is particularly adapted to be used with the standard IBM Types 1 and 2 cables, which includes two shielded twisted pairs of wires for data transmission enclosed within a braid and, in the type 2, four twisted pairs of wires for voice transmission.

In the past interconnection of the braid presented unfavorable cost and time factors. The braid at each end of every cable had to be connected to a wire by attaching a ferrule to the braid. This problem is obviated in the present invention.

BRIEF SUMMARY OF THE INVENTION

In my invention a double pole terminal block or strip is used to interconnect the wires in two composite cables, such as the above-described IBM cable or the cable described in my U.S. Pat. No. 4,761,811. The terminal block is mounted upon a metallic, conducting support bracket mounted in the interconnection box. Each end of the support bracket, proximate to where the cables come to the connector block, carries a metal clamp. These clamps secure the braid directly and so serve to interconnect, through the metallic support, the shielding braid of the two composite cables being interconnected. No ferrule is necessary.

The support brackets are insulated from one another by being insulated from the box. As a result, there can be no ground currents between the support brackets.

The interconnection box of my invention preferably carries eight terminal blocks, allowing for the connection of eight pairs of composite cables. Each entering cable passes through its respective hole in the side of the box and is held by a service entrance connector.

DESCRIPTION OF THE DRAWINGS

FIG. 3 is a side elevation showing a pair of composite cables entering the interconnection box, one cable from each side, and being interconnected using a terminal box and bracket.

FIG. 4 is a rear elevation of a portion of an interconnection box, partially broken away to show a connection.

FIG. 5 is a partial section, taken on line 5—5 of FIG. 3, showing two wires being interconnected through poles of the terminal block.

DETAILED DESCRIPTION OF THE INVENTION

Figure 1:
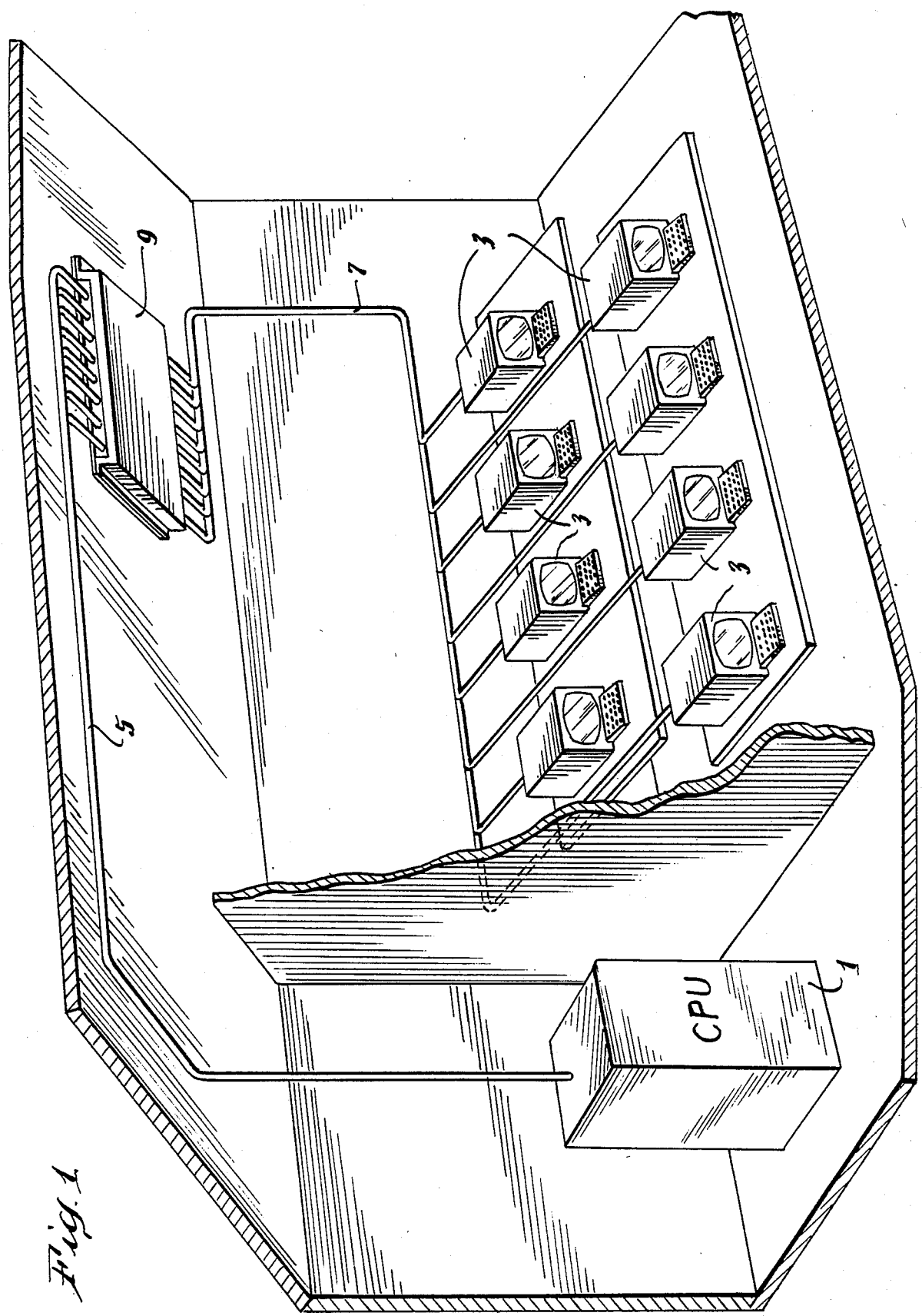
FIG. 1 is a generalized perspective view of a transmission system of a type which could use my invention. It shows a mainframe computer ("CPU") or controller connected to a remote interconnection box and thereafter leading to a plurality of computer terminals. For simplicity of illustration, the telephone terminals have not been shown.

FIG. 1 is a generalized view showing the type of arrangement in which my invention can be used. A central or mainframe computer ("CPU") or controller 1 is located remotely from a series of computer terminals 3. These terminals may be in a separate room or in several rooms. My interconnection box 9 is preferably located near the terminals. The computer 1 is connected to the box 9 by a plurality of composite cables 5, preferably one for each terminal 3, and a similar number of composite cables 7 run from interconnection box 9 to the terminals.

Cables 5 and 7 may be of the type known in the trade as IBM Type 2 data and telephone cable. They are made up of two twisted pairs of No. 22 AWG solid conductors for data communication enclosed within a braided metal cable shield. Also included within the cable jacket may be four additional pairs of No. 22 AWG solid conductors for telephones.

Alternatively, a composite cable such as that disclosed in FIG. 7 of my U.S. Pat. No. 4,761,811 can be used. It is made up of two sets of twisted pairs and associated drain wires in conductive shielding, together with one or more pairs of telephone wires, all of which are carried within an outer casing. The drain wires are in contact with the shielding and can be grounded.

Regardless of the type of cable used, it is important to have flexibility in connecting the cable with its respective terminal 3. Thus, an interconnection box 9 should be located somewhere relatively proximate to the terminals. This box, including a double pole terminal block or strip 25, having sufficient poles 28, may then be used for connecting the wires 29 and 31 of each pair of cables 5 and 7. A punch-down block may be used as the terminal block.

When connecting the cables, however, it is necessary that the braided shielding 35 of the two cables be continuous between cable 5 and cable 7 for each terminal.

A problem has existed in the past, however, when connecting cables having braided shielding. Such shielding cannot be directly connected to a terminal block, but must have a ferrule and wire attached to the braid in order to be connected. This is an additional expense in both time and labor and can add up to considerable total expense in instances of large installations. My invention solves this problem by having the insulated terminal block 25 mounted upon an electrically conductive support bracket 23, with the bracket having a metal clamp 37 at each end to receive and hold the braided shielding 35 in electrical connection with bracket 23. This interconnects the shielding of the two cables through the metal support bracket 23 itself and so provides a common path. Where composite cables are used which use drain wires, this structure can also be used to connect the drain wires instead of the braided shielding. (The drain wires would normally be connected through the terminal block, but could, if desired, be connected through the bracket 23).

Figure 2:
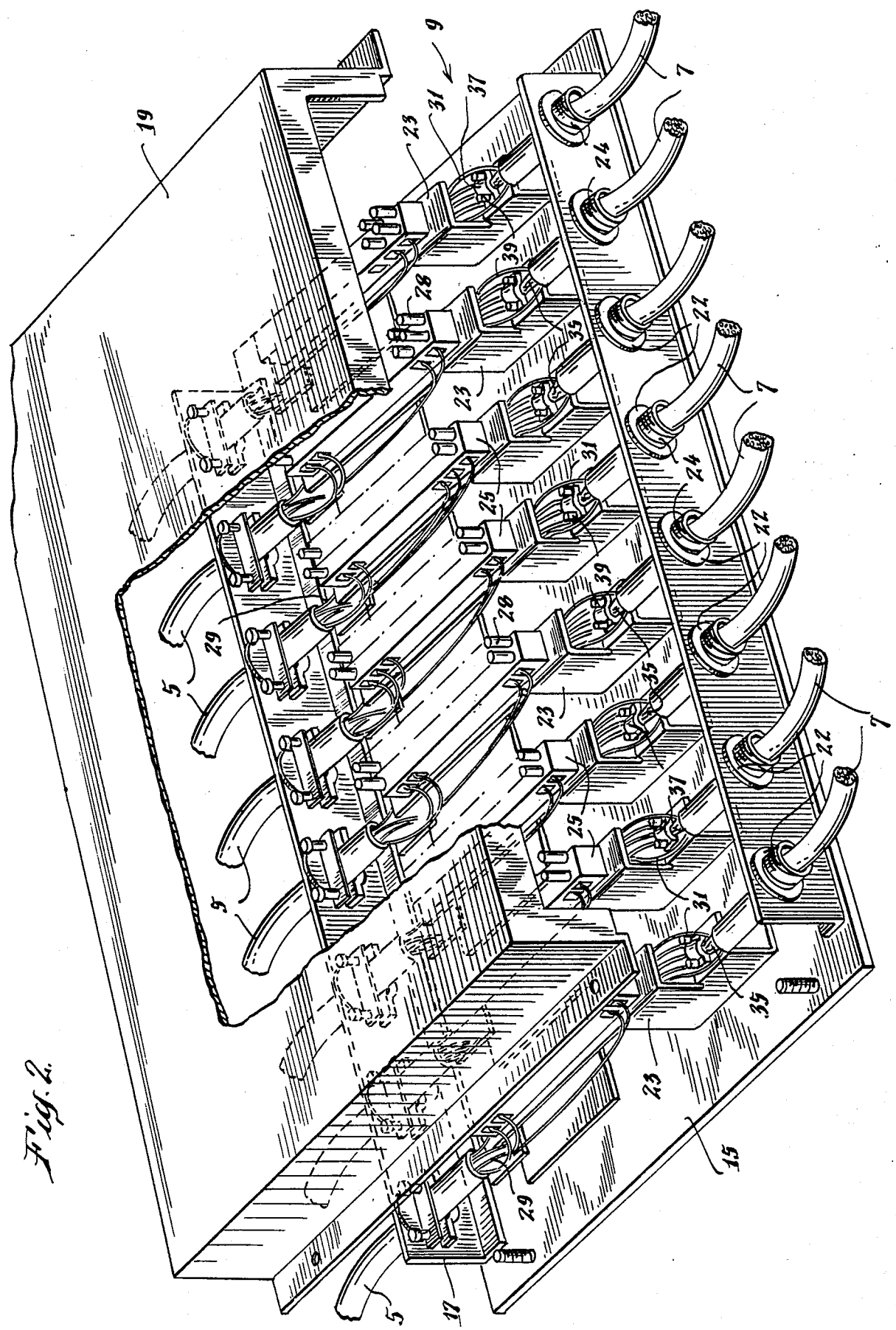
FIG. 2 is a perspective view of my interconnection box with the top partially removed and partially cut away to show inner details.

Details of the interconnection box 9 are shown in FIG. 2 and the related FIGS. 3 to 5. Box 9 has a base 15, side walls 17, and top 19. Cables 5 coming from the computer 1 enter the box through one side wall 17; and cables 7 coming from the terminals 3 enter through the opposite side wall 17. Side walls 17 include a hole 22 for each cable and a service entrance connector 24 around each cable holding it securely within place within its respective hole.

One may, of course, have interconnection boxes 9 of different sizes, depending upon the number of cables to be served. As shown here, the box serves eight pairs of incoming and outgoing cables.

A metal support bracket 23 and a double pole terminal block 25 is provided for each pair of cables. Bracket 23 is electroconductive and is mounted upon base 15 with bolts 27. It is insulated from base 15 with insulating washers 26 on bolts 27. (Alternatively, base 15 may be made of insulting material). Thus, the brackets are insulated from one another. Terminal block 25 is mounted on the upper surface of bracket 23. Block 25 may be of any desireable type, but should have a sufficient number of contact poles 28 to serve all of the wires in the composite cables being used. For example, the IBM cable referred to above has six pairs of wires and so would require at least twelve double contact poles.

The twisted pairs (wires) 29 of cable 5 are connected to the twisted pairs (wires) 31 of cable 7 in the usual manner by use of the terminal block 25.

Each end of bracket 23 includes a metal clamp 37 on its upper surface which is held in place by bolt or captive screw 39. These clamps are for securing the shielding braid 35 of the composite cable. The braid of a cable 5 would be held in the clamp 37 at one end of the bracket 23, and the braid of cable 7 would be held by the clamp 37 at the other end of the bracket. Since bracket 23 is conductive, the braids on the two cables would be thereby connected through the bracket, providing a common path. Yet, since the brackets are insulated from base 15, the shields from other pairs of cables would not be interconnected, thus avoiding ground currents.

It can now be seen that a simple system is provided for connecting the shielding braid of one cable to that of another, without the need of a ferrule.

I claim:
1. An interconnection box for use in interconnecting pairs of composite cables, said cables including a plurality of twisted pairs and shielding braid, said box including
   a housing having a base therein, at least one electroconductive support bracket mounted on said base within said housing, said bracket being insulated from said base,
   pairs of clamping means on said bracket to clamp and electrically interconnect said braid from each of said pairs of composite cables to said bracket thereby electrically interconnecting said braid from each of said pairs of composite cables through said bracket without connecting said braid to said housing, and
   a terminal block mounted on said bracket between said pairs of clamping means to interconnect said twisted pairs from one of said pairs of composite cables with said twisted pairs from the other of said pairs of composite cables,
   whereby said pairs of composite cables and their braids can be interconnected.

2. An interconnection box as set forth in claim 1 in which said clamping means includes a pair of clamps mounted upon opposite ends of said bracket and at opposite ends of said terminal block.

3. An interconnection box for use with a plurality of pairs of composite cables, each of said cables including a plurality of twisted pairs and shielding braid, said box including
   a housing having sides and a base,
   a plurality of electroconductive support brackets mounted within said housing on said base, means to insulate said brackets from said base, a pair of clamps mounted upon each said bracket, each said clamp being adapted to receive and secure said shielding braid of one said cable from one of said pairs of cables to said bracket in electrical contact therewith and without connecting said braid to said housing, and
   a terminal block mounted on each said bracket to interconnect said twisted pairs,
   whereby each of said pairs of composite cables may be interconnected in said interconnection box, a common path for each said pair of cables is provided through its respective said support bracket, and ground currents between various of said pairs is avoided.

4. An interconnection box as set forth in claim 3 in which said clamps are at opposite ends of said support bracket.

5. An interconnection box as set forth in claim 3 and including holes in said sides to receive said composite cables, and connectors holding said cables in said holes.

6. An interconnection box as set forth in claim 3 in which said insulating means are insulating washers between said brackets said base.

7. An interconnection system for connecting a plurality of pairs of composite cables together, one of each said pair being for connection to a computer and the other of said pair being for connection to a computer terminal, said system including
   a plurality of said pairs of composite cables, each said cable including twisted pairs of wires and shielding braid,
   an interconnection housing including a base, sides, and a top, openings in said sides to receive said cables
   an electroconductive support bracket for each of said pairs, each said bracket being within said housing and mounted upon and insulated from said base, a pair of clamps mounted upon said bracket at opposite ends thereof, each of said clamps securing said shielding braid from one of said cables to said bracket without connecting said braid to said housing, and a terminal block mounted on each said bracket between said clamps, said twisted pairs in each said pair of composite cables being connected through said terminal block, whereby each of said pairs of composite cables are interconnected, a common path is provided through said bracket for the braid of each of said pairs, and the braid of one of said pairs of said composite cables is not connected with the braid of others of said pairs of composite cables.

* * * * *